Jan. 14, 1958  J. B. DYER ET AL  2,819,620
COUPLING SUITABLE FOR USE WITH WINDSHIELD WIPERS
Filed Nov. 15, 1952  2 Sheets-Sheet 1

INVENTORS
JOHN B. DYER
BY WALTER D. HARRISON

THEIR ATTORNEYS

Jan. 14, 1958  J. B. DYER ET AL  2,819,620
COUPLING SUITABLE FOR USE WITH WINDSHIELD WIPERS
Filed Nov. 15, 1952  2 Sheets-Sheet 2

INVENTORS
JOHN B. DYER
BY  WALTER D. HARRISON
THEIR ATTORNEYS

United States Patent Office 2,819,620
Patented Jan. 14, 1958

2,819,620

COUPLING SUITABLE FOR USE WITH WINDSHIELD WIPERS

John B. Dyer, Syracuse, and Walter D. Harrison, Rochester, N. Y., assignors to General Motors Corporation, Detroit, Mich., a corporation of Delaware Application November 15, 1952, Serial No. 320,774

11 Claims. (Cl. 74—96)

This invention pertains to couplings, and more particularly to a clutch suitable for use with windshield wipers.

Numerous attempts have been made in an effort to develop a simple mechanism for effecting movement of wiper blades out of the normal range of vision for parking purposes. This problem has become of utmost importance in recent years by reason of the fact that conventional suction-operated wiper mechanisms are becoming obsolete due to the power requirements of present day wiping apparatus. Emphasis has been placed on developing wiper apparatus driven by a power source more reliable than suction motors, such as electric motors or means driven by the vehicle engine. It is in this field of endeavor that this invention is primarily, though not exclusively, concerned. The problem arises from the fact that an oscillating member, actuated through a motion converting mechanism from a rotary power source, only moves throughout a fixed arc. Of the solutions that have been proposed, the more successful employ a form of variable throw crank mechanism. However, these devices have not been widely accepted primarily because of their rather complicated design and construction, which contribute to their being rather costly. Accordingly, among our objects are the provision of a coupling suitable for use with windshield wiper apparatus, and the further provision of a coupling including means whereby the arc of oscillation of the driven member thereof may be varied with a fixed oscillation arc of the driving member thereof.

The aforementioned and other objects are accomplished in the present invention by providing a coupling wherein the driving member is constructed and arranged to have a plurality of driving connections with the driven member. Specifically, the coupling includes three components, namely: a dog member, a cup-shaped member, and a plate member. The dog member constitutes the driving member of the coupling, while the cup and plate members are assembled to form the driven member. An oscillatable shaft having a fixed and invariable arc of oscillation is drivingly connected to the dog and, consequently, the dog will likewise have a predetermined, fixed arc of oscillation. Oppositely extending portions of the shaft extend through central openings in the assembled plate and cup-shaped member, there being no driving connection therebetween except through the dog.

The bottom wall of the cup-shaped member has a rectangular slot therein, and the plate member has an arcuate slot therein, the arc being concentric with regard to the shaft opening, and the angular relationship between the ends of the slots being such as to enable a variable arc of oscillation of the driven coupling member with an invariable arc of oscillation of the driving member, as will be apparent hereinafter. The dog member has oppositely directed upturned ends, the ends being of stepped configuration for a reason which will later be apparent. The arrangement of the component parts is such that the shaft and dog can move axially relative to and within the spaced walls of the cup and plate assembly, whereby either of the upturned ends, but never both at the same instant, may drivingly engage the cup and plate assembly. The range of oscillation of the cup and plate assembly is dependent upon which of the two slots in the aforesaid assembly, receives one of the upturned ends of the dog.

Further objects and advantages of the present invention will be apparent from the following description, reference being made to the accompanying drawings wherein a preferred embodiment of the present invention is clearly shown.

Figure 3:
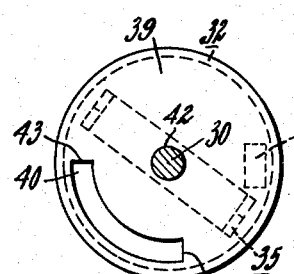
Figure 2:
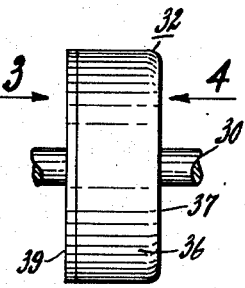
Fig. 2 is a view in elevation of the coupling.
Figure 4:
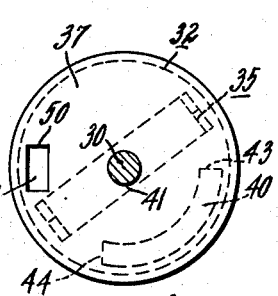

Figs. 3 and 4 are views in elevation taken in the direction of arrows 3 and 4, respectively, of Fig. 2.

Figs. 5 through 12 inclusive are views, partly in elevation and partly in section, showing the relative positions of the component coupling parts in various stages of operation.

Figs. 13 through 20 are sectional views taken, respectively, on lines 13—13, 14—14, 15—15, 16—16, 17—17, 18—18, 19—19 and 20—20 of Figs. 5 through 12, inclusive.

Figure 21:
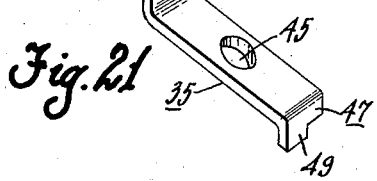

Fig. 21 is a view in perspective of the dog constituting the driving member of the coupling.

Figure 1:
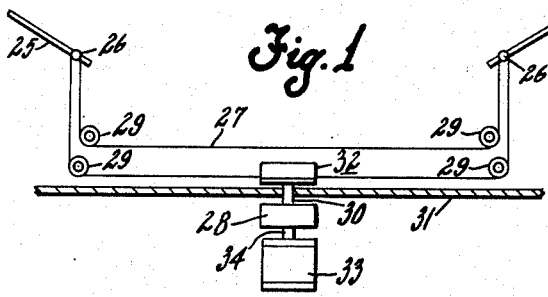
Fig. 1 is a diagrammatic view illustrating the use of the coupling of this invention in a windshield wiper apparatus.

With particular reference to Fig. 1, the numeral 25 designates wiper arms for blades of a windshield wiping apparatus. The arms 25 are pivotally mounted at 26 to any suitable support structure, such as a vehicle cowl, not shown. The pivots 26 embody pulleys or drums, not shown, about which a cable 27 is passed, the ends of the cable being attached to an oscillatable coupling 32. A plurality of guide pulleys 29 are utilized to maintain proper alignment of the cable 27 and are mounted for rotation by any suitable means, not shown. The coupling 32 is connected by shaft 30 which extends through a vehicle fire-wall 31 to a motion converting mechanism 28. A detailed explanation of the coupling operation will follow hereinafter but for the present, it will suffice to say that the coupling 32 is driven from the mechanism 28 by the oscillating shaft 30, the oscillating mechanism, in turn being driven by a rotary power source 33, such as an electric motor, through the intermediary of a shaft 34.

It is to be understood that the converting mechanism 28 may be of any suitable type well known in the art, and functions to convert rotary motion of the shaft 34 into oscillatory motion of the shaft 30 throughout a fixed, predetermined and invariable arc. Moreover, the shaft 30 is so mounted by means, not shown, so as to be capable of axial movement relative to both the mechanism 28 and the coupling 32. The prior art is replete with converting mechanisms which transform rotary motion into oscillatory motion of a shaft throughout a predetermined fixed arc. However, the problem of varying the arc of oscillation of the wiper arms 25 with a fixed and invariable arc of oscillation of the shaft 30 is not of easy solution, and it is this problem which the present invention solves in a most satisfactory manner by an exceedingly simple coupling design.

With particular reference to Figs. 2 to 4, and 21, the coupling 32 is disclosed as including a dog member 35, which is anchored by any suitable means to the shaft 30 such that all movements of the shaft 30 are transmitted to the dog 35. Thus, as the shaft 30 is moved axially by any suitable means, not shown, the dog 35 will likewise be moved axially. In a like manner as the shaft 30 is oscillated by the mechanism 28 throughout a fixed and invariable arc, the dog 35 will be so oscillated. The coupling 32 further includes a cup-shaped member 36, having in a bottom wall 37 thereof a rectangular slot 38. The third component part of the coupling comprises a circular plate 39 having therein an arcuate slot 40 extending throughout an angle greater than 90° but less than 180°.

The cup-shaped member 36 and the plate 39 have centrally disposed circular openings 41 and 42 therein, respectively. The coupling is assembled in the following manner: the shaft 30 is inserted through the opening 42 in the plate member 39. Then the dog 35 is secured to the shaft 30 adjacent the right-hand surface of plate 39, as viewed in Fig. 2. Thereafter, the cup-shaped member 36, having the opening 41 in the bottom wall thereof, is inserted over the end of shaft 30 and moved into engagement with plate 39. Thus, the dog 35 is positioned between parallel spaced walls of the cup-shaped member 36 and plate member 39. Finally, the members 36 and 39 are rotated relative to each other to bring the respective slots in these members into the relative position they are shown in Figs. 3 and 4, after which the members 36 and 39 are securely fastened together.

It is to be understood that the assembly of members 36 and 39 as a unit constitutes the driven member of the coupling which may have provision for attaching the ends of a flexible cable thereto, in any suitable manner as is well known in the art. Moreover, the driven member is rotatably journaled about shaft 30 due to the alignment of holes 41 and 42 in the component parts thereof and, consequently, movement of the shaft 30 can only be transmitted to the driven coupling member through the dog 35, as will later be described. The arcuate slot 40 in the plate member 39 is concentrically disposed with respect to the opening 42 and the shaft 30. Moreover, when the parts 36 and 39 are assembled, it is to be noted that the end 43 of the slot 40 is substantially diametrically opposed to the medial portion of slot 38 in the bottom wall of member 36. In other words, a diametrical line extending through the center of opening 42 and coincident with the end 43 of slot 40 would divide the slot 38 into substantially equal portions. However, by reason of the slot 40 being of greater angular extent than 90°, the end 44 thereof, which is disposed at substantially right angles to the end 43 thereof, is not in alignment with a straight line passing through the center of opening 42.

With particular reference to Fig. 21, the construction of the dog 35, centrally apertured at 45 for attachment to the shaft 30, will now be described. The dog 35 has portions of equal length extending from opposite sides of the aperture 45. Each end of the dog portion is upturned an equal amount in opposite directions at 46 and 47. Each of the upturned ends 46 and 47, which extend at substantially right angles to the interconnecting portion of the dog 35, are stepped, with the high portions of the steps being in alignment, though oppositely directed. Thus, end 46 has a stepped portion 48 and end 47 has a stepped portion 49. The function of the stepped end portions of the dog 35 will be dealt with hereinafter. It should also be noted that as the upturned end portions of the dog 35 are equally spaced from the center of aperture 45, the slots 38 and 40 must necessarily be displaced equal radial distances from the center of aligned openings 41 and 42.

Figure 5:
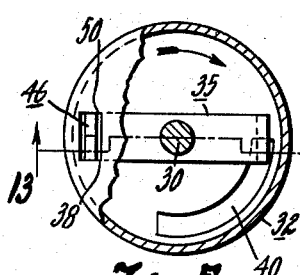
Figure 6:
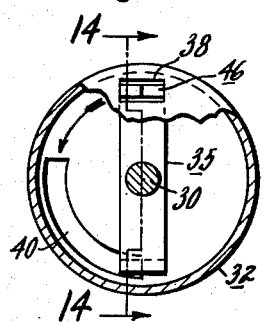
Figure 7:
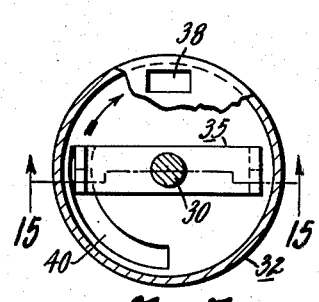
Figure 13:
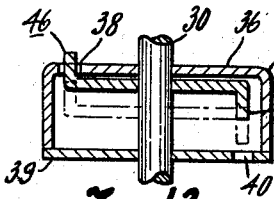
Figure 14:
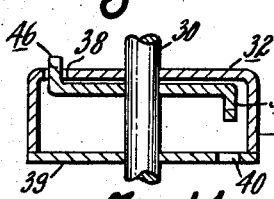
Figure 15:
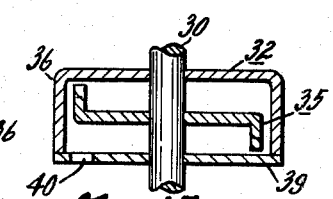
Figure 8:
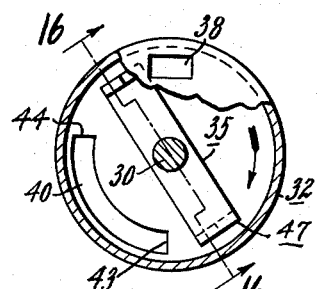
Figure 9:
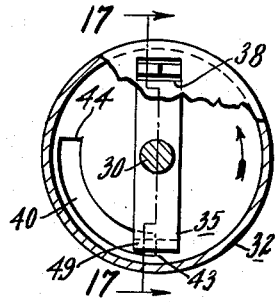

The operation of the coupling or clutch will now be described in conjunction with Figs. 5 through 20 of the drawings. In the description of the operation it will be assumed for purposes of clarity and simplification that the arc of oscillation of shaft 30 and, consequently, the dog 35 is a fixed and invariable angle of 90°. Moreover, the arrows in Figs. 5 through 11 indicate the direction of oscillatory movement of the shaft 30 and dog 35. In the description of the operation, it will further be assumed that the entire end portion 46 is fully engaged with slot 38 of the driven coupling member constituted by the cup-shaped portion 36 and the plate 39 as a point of beginning. This condition is represented in Figs. 5 and 13, and it is readily apparent that upon oscillation of the dog 35 through its fixed and invariable arc, the driven coupling member will, likewise, be moved through the same arc of oscillation by reason of the clearances between the end 46 of the dog and the slot 38 being reduced to an absolute minimum. The same conditions prevail in Figs. 6 and 14, and, thus, the driven member of the coupling will be oscillated between the positions it is shown in Figs. 5 and 6 as long as the driving member of the coupling is being so oscillated. Accordingly, if the driven member of the coupling is operatively connected to wiper blades in the manner suggested diagrammatically in Fig. 1, the blades will be operated over the normal or wiping range.

If it is desired to stop wiper blade movement and park the blades out of the normal range of vision, the following sequence of steps must transpire: initially the shaft 30 and dog 35 must be moved axially relative to the coupling 32 from the position it is shown in cross section in Fig. 13 to the position it is shown in phantom, by dotted lines, in this figure. When the dog 35 is in the dotted line position, as shown in Fig. 13, the driving connection between the driven coupling member and the driving coupling member has been disrupted. Accordingly, the dog 35 oscillates without driving the driven coupling member constituted by the assembly of cup 36 and plate 39. The prevalence of this condition is pictorially shown in Figs. 7, 8, 15 and 16. However, as the dog 35 and shaft 30 are moved axially relative to the driven coupling member, the end 47 of the dog will come into contact with the plate 39.

Figure 10:
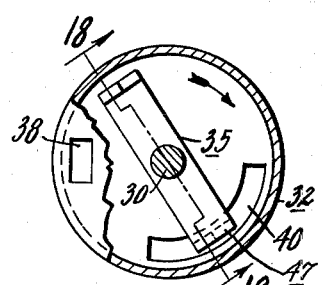
Figure 16:
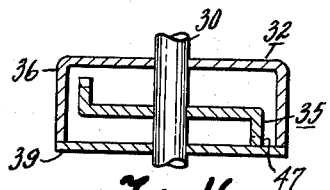
Figure 17:
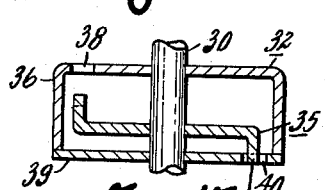
Figure 18:
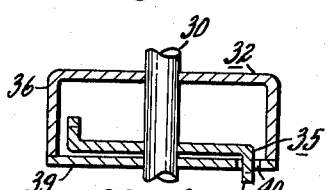
Figure 11:
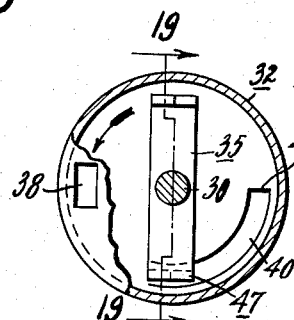

Specifically, the stepped portion 49 of the end 47 will contact plate 39, and by reason of the arcuate slot 40 in the plate 39 being of greater angular extent than 90°, the stepped end 49 will enter slot 40 adjacent end 43 thereof. Accordingly, when the dog 35 moves in a counterclockwise direction, as shown by the arrows in Fig. 9, the driven coupling member will likewise be moved counterclockwise to the position it is shown in Fig. 10. Continuing axial movement of the shaft 30 and dog member 35, when the dog 35 reaches the end of its fixed oscillation arc and moves in a clockwise direction, as shown by the arrow in Fig. 10, will result in the entire end portion 47 of the dog moving into the arcuate slot 40. During this clockwise movement of dog 35, as shown in Figs. 10 and 18, no movement will be transmitted to the driven coupling member by reason of the arcuate extent of the slot 40. This in effect constitutes a lost motion mechanism between the driving and driven coupling members allowing the driving dog 35 to oscillate free of the driven coupling member. Likewise, when the oscillation of dog 35 reverses to counterclockwise movement, as is shown in Fig. 11, no movement of the driven coupling member will ensue until the end 47 of the dog moves into engagement with the end 43 of the slot 40 in plate 39.

Figure 12:
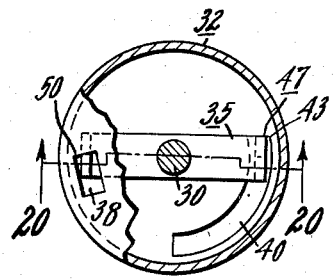
Figure 19:
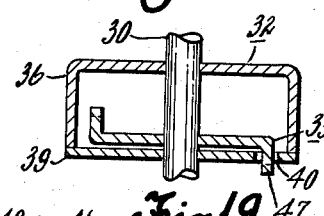

However, when the end portion 47 of the dog 35 engages end 43 of the slot 40, the driven coupling member will be moved to the position it is shown in Fig. 12. In this manner the arc of oscillation of the driven coupling member may be varied with a fixed oscillation arc of the driving coupling member. The amount by which the oscillation arc of the driven coupling member differs from the invariable arc of oscillation of the driving coupling member is determined by the relative widths of the stepped end portions 48 and 49 of the dog 35, as well as the angular relationship between end 43 of the slot 40 and the rectangular slot 38. When the coupling is designed primarily for actuating wiper blades, a variable arc of oscillation of the driven member between 5° and 10° greater in one direction than the driving member is usually sufficient. Moreover, as disclosed, the arc of oscillation of the driven member is only varied in one direction by reason of the fact that this is all that is required to adapt a coupling to windshield wiper apparatus.

When the novel coupling of this invention is embodied in windshield wiper apparatus, it is to be understood that any suitable switch means, not shown, will be provided to disrupt the electrical circuit connection to the motor 33 when the blades have reached the parked position. Likewise, the switch means will be interconnected with the mechanism for moving the shaft and dog axially in such a manner that the vehicle operator will be able to park the wiper blades and stop motor operation by manipulation of a single control element.

Figure 20:
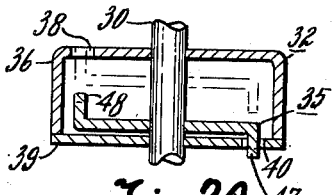

When the driven coupling member has been moved to the position it is shown in Fig. 12 and the driving member has been disconnected from its power source such that it no longer oscillates, operation of the driven coupling member throughout the fixed oscillation arc of the driving coupling member may be instituted in the following manner: the shaft 30 and dog 35 are moved axially from the solid line position it is shown in Fig. 20 to the dotted line position it is shown therein. Simultaneously with this axial movement of the driving member, the power source is energized whereby the driving member oscillates throughout its fixed arc. When the dog 35 is moved from the solid line position it is shown in Fig. 20 to the dotted line position it is shown therein, the stepped end portion 48 will engage the end 50 of rectangular slot 38. Upturned end 46 of the dog 35 is stepped to facilitate the entering of this end into slot 38 when normal operation is to be resumed. Accordingly, when dog 35 is rotated in a clockwise direction, as viewed in Fig. 12, the driven coupling member will be moved throughout the fixed arc of movement of the dog and upon reversal of dog movement in a counterclockwise direction, the full width of end 46 of the dog will move into engagement with the slot 38 under continued axial thrust of the shaft 30 in the direction of cup 36. Thus, after one complete cycle of oscillation of the dog 35, the driven coupling member will be moved between the two positions it is shown in Figs. 5 and 6. The stepped portion 49 of dog end 46 performs the same function of facilitating engagement between this dog end and slot 40 when the arc of oscillation of the driven member is to be varied. It is to be understood that suitable means, not shown, will have to be provided for urging the shaft 30 axially and consequently urging the upturned ends of the dog 35 into full engagement with the respective slots of the driven member after the respective stepped end portions have been moved into engagement with their respective slots.

It is readily apparent from an understanding of the foregoing description that the novel coupling or clutch of this invention, when used in conjunction with windshield wiper apparatus, will perform the following functions: it will operate the wiper blades over the normal wiping range; it will operate the blades beyond the normal range for parking purposes; the blades may be disconnected from the driving mechanism therefor when they are in the parked position by merely moving dog 35 free of either slot in the driven member to facilitate manual movement of the blades when the windshield is being cleaned; and it will operatively drive the blades from any position they may be in due to manual movement thereof when the clutch is disengaged and lock the blades in proper engagement with the driving mechanism. Moreover, it is readily apparent that the coupling herein disclosed will be very economical to manufacture and represents a much needed practical solution to the problem of parking wiper blades driven by a rotary power source.

While the embodiment of the present invention as herein disclosed, constitutes a preferred form, it is to be understood that other forms might be adopted.

What is claimed is as follows:

1. A mechanical movement including, a coupling comprising oscillatable driving and driven members, one of said members having a pair of angularly spaced projections extending outwardly therefrom, the other of said members having a pair of angularly spaced receptive slots of unequal angular extent therein, and means operatively connected to said driving member for imparting oscillation of fixed amplitude thereto, whereby the amplitude of oscillation imparted to said driven member may be varied relative to the fixed amplitude of oscillation imparted to said driving member dependent upon which of the projections in said one member engages a slot in said other member.

2. A mechanical movement including, a coupling comprising oscillatable driving and driven members, one of said members having a pair of oppositely directed projections extending outwardly therefrom, the other of said members having a pair of misaligned receptive slots therein of unequal angular extent and located in spaced planes on opposite sides of said one member, and means operatively connected to said driving member for imparting oscillation of fixed amplitude thereto, whereby the amplitude of oscillation of said driven member may be varied relative to the fixed amplitude of oscillation imparted to said driving member dependent upon which of the projections in said one member engages a slot in said other member.

3. A mechanical movement including, a coupling comprising oscillatable coaxially disposed driving and driven members, one of said members having a pair of diametrically opposed projections extending axially therefrom, the other of said members having a pair of misaligned receptive slots of unequal angular extent therein, and means operatively connected to said driving member for imparting oscillation of fixed amplitude thereto, whereby the amplitude of oscillation of said driven member may be varied relative to the fixed amplitude of oscillation imparted to said driving member dependent upon which of the projections in said one member engages a slot in said other member.

4. A mechanical movement including, a coupling comprising oscillatable driving and driven members, one of said members having a pair of diametrically opposed projections of equal size extending axially therefrom, the other of said members having a pair of misaligned receptive slots therein of unequal size, and means operatively connected to said driving member for imparting oscillation of fixed amplitude thereto, whereby the amplitude of oscillation of said driven member may be varied relative to the fixed amplitude of oscillation imparted to said driving member dependent upon which of the projections in said one member engages a slot in said other member.

5. A mechanical movement including, a coupling comprising oscillatable driving and driven members, one of said members being moved axially relative to the other of said members, one of said members having a pair of angularly spaced oppositely directed projections extending axially therefrom, the other of said members having a pair of misaligned receptive slots therein of unequal angular extent and located in spaced planes on opposite sides of said one member, and means operatively connected to said driving member for imparting oscillation of fixed amplitude thereto, whereby the amplitude of oscillation of said driven member may be varied relative to the fixed amplitude of oscillation imparted to said driving member dependent upon which of the projections in said one member engages a slot in said other member.

6. In a mechanical movement, the combination including, a coupling comprising oscillatable driving and driven members having a plurality of portions engageable in different arrangements, and means operatively connected to said driving member for imparting thereto an oscillatory motion of fixed amplitude, said members being so constructed and arranged for operative engagement in either of two arrangements so that the amplitude of oscillation imparted to said driven member may be varied while the amplitude of oscillation of said driving member is fixed.

7. In a mechanical movement, the combination including, a coupling comprising oscillatable driving and driven members having a plurality of engageable portions for establishing different driving connections therebetween, and means operatively connected to said driving member for imparting thereto an oscillatory motion having a fixed arc, said members being constructed and arranged for relative axial movement to alter the driving connection therebetween so as to vary the arc of oscillation imparted to said driven member.

8. A mechanical movement including, a coupling comprising oscillatable driving and driven members, one of said members having a pair of angularly spaced projections having stepped end portions extending outwardly therefrom, the other of said members having a pair of angularly spaced receptive slots of unequal angular extent therein and means operatively connected to said driving member for imparting oscillation of fixed amplitude thereto, whereby the amplitude of oscillation of said driven member may be varied relative to the fixed amplitude of oscillation imparted to said driving member dependent upon which of the projections in said one member engages a slot in said other member.

9. A mechanical movement including, a coupling comprising oscillatable driving and driven members, one of said members having a pair of angularly spaced projections extending outwardly therefrom, the other of said members having a pair of angularly spaced receptive slots therein, the angular spacing of the projections being different than the angular spacing of the ends of said slots, one of said slots being of rectangular configuration and the other of said slots being of arcuate configuration, and means operatively connected to said driving member for imparting oscillation of fixed amplitude thereto, whereby the amplitude of oscillation of said driven member may be variable relative to the fixed amplitude of oscillation imparted to said driving member dependent upon which of the projections in said one member engages a slot in said other member.

10. A mechanical movement including, a coupling comprising oscillatable driving and driven members, one of said members having a pair of angularly spaced projections extending outwardly therefrom, the other of said members having a pair of receptive slots of unequal angular extent therein, one of said slots being of rectangular configuration and the other of said slots being of arcuate configuration, the ends of said slots being misaligned, and means operatively connected to said driving member for imparting oscillation of fixed amplitude thereto, whereby the amplitude of oscillation of said driven member may be varied relative to the fixed amplitude of oscillation imparted to said driving member dependent upon which of the projections in said one member engages a slot in said other member.

11. A coupling including, a driving member comprising a dog having a pair of oppositely directed upturned ends, a driven member comprising a cup-shaped element and a plate element presenting spaced walls within which the dog is disposed, and a shaft rotatably connected to said dog, said driven member being journaled for rotation about said shaft, said shaft and dog being mounted for axial movement relative to said driven member, and said driven member having a pair of angularly misaligned slots in said spaced walls, each receptive of one of said upturned dog ends.

References Cited in the file of this patent

UNITED STATES PATENTS

| | | |
|---|---|---|
| 231,828 | McCord | Aug. 31, 1880 |
| 1,140,293 | Smeeth | May 18, 1915 |
| 1,361,797 | Norton | Dec. 7, 1920 |
| 1,451,368 | Miller | Apr. 10, 1923 |
| 2,046,108 | Drew | June 30, 1936 |
| 2,109,701 | Jordan | Mar. 1, 1938 |
| 2,137,628 | Sayre | Nov. 22, 1938 |
| 2,220,463 | Sinclair | Nov. 5, 1940 |

FOREIGN PATENTS

| | | |
|---|---|---|
| 643,494 | France | May 16, 1938 |